(12) United States Patent
Cecconello et al.

(10) Patent No.: US 8,319,448 B2
(45) Date of Patent: Nov. 27, 2012

(54) DRIVER ARRANGEMENT FOR LIGHT EMITTING DIODES

(75) Inventors: Nico Cecconello, Ponte S. Nicolò (IT);
Paolo De Anna, Vallà di Riese Pio X (IT); Nicola Zanforlin, Campodarsego (IT)

(73) Assignee: Osram AG, Munich (DE)

( * ) Notice: Subject to any disclaimer, the term of this patent is extended or adjusted under 35 U.S.C. 154(b) by 267 days.

(21) Appl. No.: 12/809,071

(22) PCT Filed: Dec. 20, 2007

(86) PCT No.: PCT/IT2007/000894
§ 371 (c)(1),
(2), (4) Date: Sep. 8, 2010

(87) PCT Pub. No.: WO2009/081423
PCT Pub. Date: Jul. 2, 2009

(65) Prior Publication Data
US 2011/0001439 A1    Jan. 6, 2011

(51) Int. Cl.
*H05B 41/16* (2006.01)
(52) U.S. Cl. ......... 315/246; 315/299; 315/308; 315/362
(58) Field of Classification Search .................. 315/246, 315/291, 299, 307, 308, 362
See application file for complete search history.

(56) References Cited

U.S. PATENT DOCUMENTS

| 7,038,594 | B2 * | 5/2006 | Voreis et al. ............. 340/815.45 |
| 7,999,487 | B2 * | 8/2011 | Szczeszynski ................. 315/291 |
| 2004/0135522 | A1 | 7/2004 | Berman et al. |
| 2005/0185428 | A1 | 8/2005 | Crawford et al. |
| 2007/0159421 | A1 | 7/2007 | Peker et al. |
| 2009/0212717 | A1 | 8/2009 | Trattler |
| 2009/0284178 | A1 | 11/2009 | Jessenig et al. |

FOREIGN PATENT DOCUMENTS

| DE | 102005028403 A1 | 12/2006 |
| DE | 102006024422 A1 | 11/2007 |
| EP | 1672706 A1 | 6/2006 |

OTHER PUBLICATIONS

International Search Report of PCT/IT2007/000894 mailed Nov. 11, 2008.

* cited by examiner

*Primary Examiner* — Thuy Vinh Tran

(57) ABSTRACT

A driver arrangement for LEDs may include a PWM controller to deliver a feed voltage between an output line and a ground output line, said controller having a pin, a current regulator to regulate the feed current, a switch to connect said pin to a scaled-down version of the voltage on the first output line, and a control line to receive a signal to produce dimming, said control line coupled to said regulator and said switch to couple said regulator to a reference voltage and control switching, whereby: in one of the levels of a PWM control signal, said regulator interrupts said feed current, the voltage on said ground output line is floating, and in the other levels, said regulator is coupled to said reference voltage, said switch disconnects said pin from said voltage on the output line and the voltage on said ground output line is regulated.

5 Claims, 1 Drawing Sheet

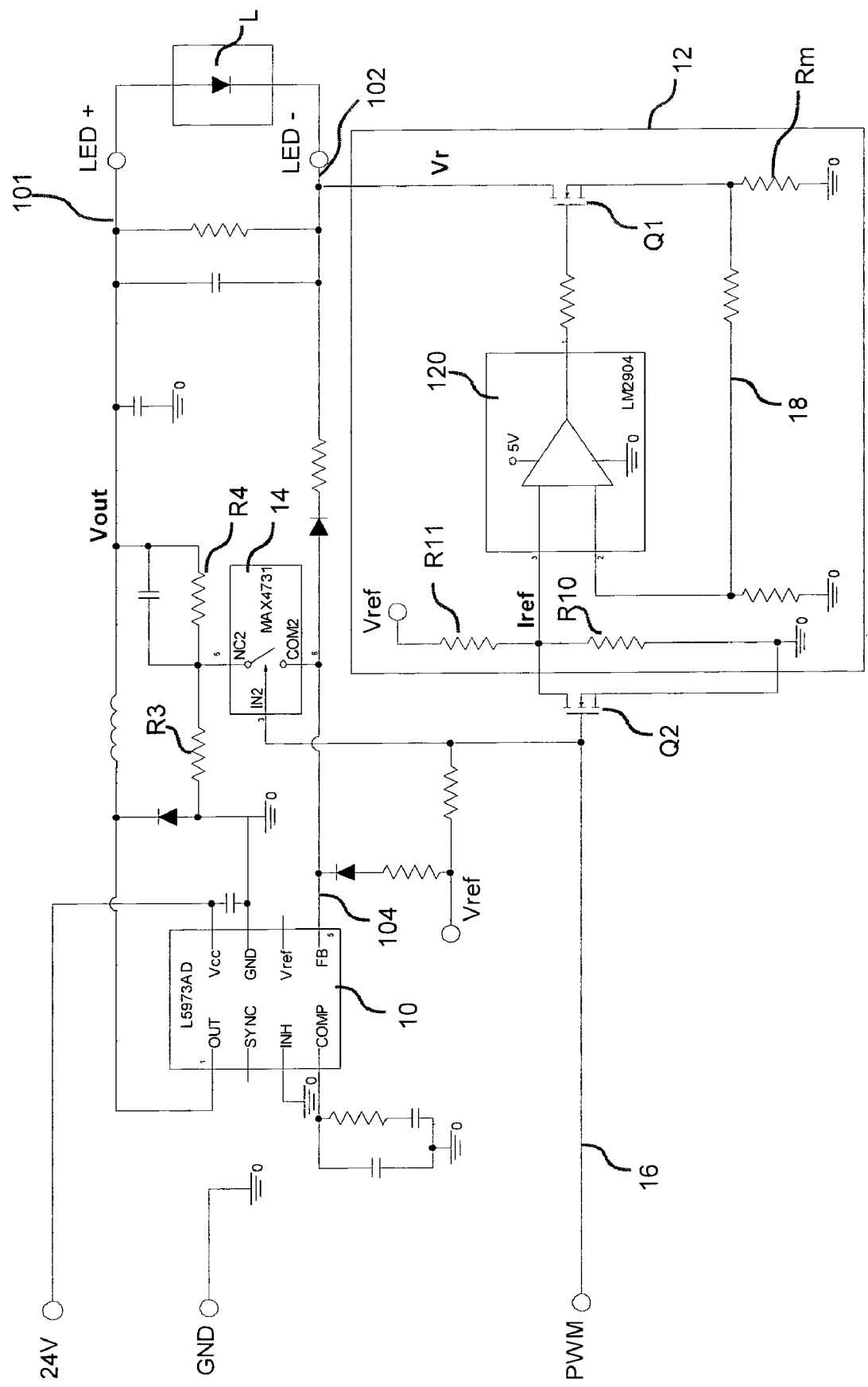

DRIVER ARRANGEMENT FOR LIGHT EMITTING DIODES

RELATED APPLICATIONS

The present application is a national stage entry according to 35 U.S.C. §371 of PCT application No.: PCT/IT2007/000894 filed on Dec. 20, 2007.

TECHNICAL FIELD

The disclosure relates to techniques for driving Light Emitting Diodes or LEDs.

The disclosure was devised by paying specific attention to its possible use in driving LEDs used as lighting sources. However, reference to this possible application is not to be construed in a limiting sense of the scope of the disclosure.

BACKGROUND

Driving LEDs, especially LEDs used for lighting purposes, poses a number of basic requirements to be met.

Compactness and high electrically efficiency of the driver may represent a first requirement, in view of the expected large lots of production. High performance PWM (Pulse Width Modulation) dimming capability (e.g. LED current rise/fall times lower than, say, 5 microseconds) represents an other requirement. Very low LED current ripple (e.g. less than 1%) is another desired feature.

High efficiency and compactness may be achieved with a single-stage switching arrangement at the expense of high ripple current and poor fall/rise time performance. Other existing LED driver arrangements may lead to good fall/rise time performance and low ripple that exhibit poor efficiency.

In fact, Pulse Width Modulation (PWM) dimming a LED to adjust the brightness (i.e. light intensity) thereof involves a switching arrangement which alternatively turns the LED on and off. Adjusting the duty cycle of the on/off waveform (i.e. PWM modulating such a waveform) dictates the average power supplied to the LED and, consequently, the brightness of the light radiation generated thereby.

Switching arrangements used to drive LEDs are inherently prone to generating high-frequency (HF) switching ripple. A typical arrangement to avoid ripple on the current fed to a LED being dimmed is using a so-called linear current regulator, which involves deriving a feedback current signal from the feed line of the LED. This regulator has the inherent drawback of low efficiency.

Document DE-A-10 2005 028 403 discloses an arrangement which retains the advantages of low ripple current and faster rise/fall times of linear current regulators while improving the overall efficiency involves resorting to double stage solutions involving a high-efficiency pre-regulator (DC/DC) which delivers a voltage to one or more linear current regulators. A feedback signal controls the output voltage of the DC/DC stage in such a way that the voltage drop across the linear regulators is minimized. Such an arrangement involves using comparators to compare the voltages across the various current regulators with a defined, minimized reference value. When the voltage across a linear regulator is lower than the reference, the voltage VDD delivered by the DC/DC regulator is increased. When the output voltage is higher than the reference, the voltage VDD is decreased. This is a so called hysteretic control or "bang-bang" control.

SUMMARY

Despite its effectives, such a control arrangement exhibits evident drawbacks, especially in the case of the PWM dimmed applications. In that case, the current on the or each LED is chopped (on and off) by a square wave PWM signal to change the LED brightness. During the "off" time of the PWM signal, when the voltage on the inverting inputs of the comparators is high, a conventional hysteretic or "bang-bang" control arrangement will tend to decrease gradually the VDD voltage. At PWM turn on, the voltage in question will generally be too low for the current regulator to properly control the LED current.

The need is therefore felt for an improved arrangement which, in addition to dispensing with the drawback outlined in the foregoing, may also meet the following requirements:
    driving one or more LED modules or strings from a single voltage source,
    controlling LED brightness with PWM technique,
    minimizing high frequency ripple on the LED current while optimizing LED current rise and fall times (this is a typical requirement for a high performance colour management system),
    maintaining electrical efficiency as high as possible, and
    minimizing the overall dimensions of the arrangement.

The object of the invention is thus to provide an improved arrangement which may properly meet the needs outlined in the foregoing.

According to the invention, that object is achieved by means of a driver arrangement having the features set forth in the claims that follow.

The claims form an integral part of the disclosure of the invention as provided herein.

In an embodiment, a double stage (cascade) LED driver arrangement is provided with a simple, very effective control strategy involving:
    a switching stage (which by itself is very efficient and compact), and
    a linear stage cascaded thereto with fast rise and fall times and a low ripple.

In an embodiment, the arrangement described herein may be controlled based on a smart procedure in order to minimize losses without losing a fast dynamic performance.

BRIEF DESCRIPTION OF THE ANNEXED DRAWING

The invention will now be described, by way of example only, with reference to the annexed FIGURE of drawing which is a block diagram of an exemplary embodiment of the arrangement described herein.

DETAILED DESCRIPTION

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

The block diagram of the FIGURE of the drawing is built around three basic components which, per se, are known in the art and are currently available at the time this application is filed.

Specifically, reference 10 denotes a DC/DC converter which is connected between a constant supply voltage (for instance 24 Vcc) and the ground (0 or GND) to generate on output lines 101, 102 a feed voltage for a LED module comprised of one or more LEDs (e.g. plural LEDs arranged in a LED "string"). The LED or LEDs in question are designated L as a whole.

While shown in the drawing for the sake of completeness of illustration, the LED module L does not represent per se a part of the driver arrangement which forms the subject matter of this disclosure.

More specifically, the converter 10 provides a voltage Vout on the first output line 101 while the "ground" output line 102 is connected to a linear current regulator 12 which—in the exemplary embodiment shown—is built around an error amplifier 120. Finally, reference 14 denotes an electronic switch.

While a reference to these components is not to be construed in a limiting sense of the scope of the invention, exemplary components adapted for implementing the elements denoted 10, 12 (120) and 14 are the components L5973AD (DC/DC regulator 10), LM2904 (error amplifier 120) and MAX 4731 (switch 14).

In the drawing, the components in question are shown coupled with ancillary components such as resistors, capacitors, inductors providing proper bias, filtering and so on as required for proper operation. Those of skill in the art will appreciate that the arrangement of ancillary components as shown herein for exemplary purposes is just one of a plurality of possible arrangements. Devising alternative arrangements of ancillary components (and selecting the proper values for these components) is a design task well within the ability of the experienced technician in the art and do not require a detailed description herein.

For the purposes herein, it will suffice to mention that a voltage divider including resistors R3 and R4 is provided between the line 101 (i.e. the voltage Vout) and ground (or 0 voltage). The voltage divider in question has an intermediate point (that is the point where the resistors R3 and R4 are connected to each other) adapted to be selectively connected via the switch 14 to the feedback pin 102 of the regulator 10 (this may be the FB pin of L5973AD), which will therefore act as a PWM controller. For the sake of clarity it will be recalled that the regulator 10 (e.g. L5973) provides a high frequency PWM (e.g. >50 kHz) to regulate the output voltage Vout at the desired value.

This is not to be confused with the PWM dimming action proper, which is controlled by an external, low frequency (e.g. 100-500 Hz) PWM control signal derived from e.g. a manual control such as a slider actuated by a user to select a desired level of dimming of the LED module L.

The PWM control signal in question is fed over a line 16 to provide the PWM dimming action (selective on/off switching) of the LED module L.

The PWM signal provided on the line 16 controls the switch 14 and the gate of an electronic switch Q2.

The switch Q2 has the purpose of conveying towards the non-inverting (+) input of the error amplifier 120, alternatively, a non-zero nominal current reference value (e.g. 700 mA) or a zero value (0 mA) as a function of the value of the PWM control signal applied on the line 16.

To that effect, another voltage divider comprised of two resistors R10 and R11 is arranged between a reference voltage Vref and ground (0 voltage) with an intermediate point (i.e. the point where the resistors R10 and R11 are connected to each other) connected to the non-inverting input of the error amplifier 120.

In an embodiment, the control switch Q2 is a mosfet whose drain-source line is connected across the resistor R10. The switch Q2 thus causes a reference voltage to be generated at the non-inverting input of the error amplifier 120, which reference voltage is a function of an external reference voltage Vref and the values of R10 and R11.

The switch Q2 thus controls via the error amplifier 120 the gate of another electronic switch Q1 (again a mosfet in an embodiment) which is arranged between the line 102 (i.e. the voltage V) and a shunt current measurement resistor Rm.

Reference 18 denotes the feedback line of the linear current regulator 12 which senses via the sensing resistor Rm voltage representative of the current flowing through the switch Q1 (which corresponds to the current flowing through the LEDs) and feeds it back to the inverting input of the error amplifier 120.

Essentially, the role of the error amplifier 120 is to maintain the LED current regulated at the value specified on the non-inverting input by acting on the power mosfet Q1 according to a typical feedback scheme. If the current measured (i.e. sensed) is lower than the desired value for the current, the error amplifier 120 increases the opening of the channel of the power mosfet thus increasing the current through the LEDs. Conversely, if the current sensed is higher than the desired value for the current, the error amplifier 120 decreases the opening of the channel of the power mosfet thus reducing the current through the LEDs Operation of the arrangement shown in the drawing is as follows.

When the PWM signal on the line 16 is high, the voltage at the non-inverting input of the error amplifier 120 is equal to zero and the mosfet comprising the switch Q1 is open circuit, so that the current on the LED module L is equally zero ("off" portion of the PWM dimming action of the LED module) and the current regulator is practically de-activated. The voltage Vr on the "ground" line 102 is floating. The logical switch 14 is closed and connects the feedback pin 104 of the PWM controller 10 to a voltage as Vpart present ad the intermediate point between resistors R3 and R4 in the voltage divider formed thereby. The voltage Vpart is a scaled-down version of the output voltage Vout on the line 101.

In this state, the voltage Vout is regulated at a defined value that is set to be high enough, i.e. higher than a threshold selected to ensure that the linear current regulator 12 will work properly at the subsequent PWM turn on.

When the PWM on the line 16 is low, the current regulator 12 is activated ("on" portion of the PWM dimming action of the LED module). The current regulator controls the LED current at the desired value Iref as set by reference voltage Vref and the values of the resistors R10, R11. At the same time, the switch 14 will be open and the feedback pin 104 of the PWM controller 10 will be disconnected from the voltage divider R3, R4 (and thus rendered independent of Vout).

In this state, the voltage Vr on the "ground" line 102 will be actively and dynamically regulated at a level (Vrl) which is selected to be the lowest possible value that allows at the same time to minimize the power losses in the linear regulator 12 while still ensuring LED current regulation.

It will be appreciated that the relationship between the "high" and "low" states of the PWM signal on the line 16 and the "off" and "on" portions of the PWM dimming action of the LED module may be the opposite to the one referred to in the foregoing, due e.g. to the presence of a logical inverter associated with the line 16. For that reason, one and the other of the on/off levels of the PWM control signal are recited in the claims that follow.

Additionally, it will be appreciated that the designation of the output line 102 of the controller 10 as a "ground" line is related to the notional role of that line with respect to the first output line 101 (which is brought to a voltage Vout). As described, the voltage Vr on the line 102 is not fixed to ground (i.e. to zero), but is either floating or regulated to a minimum value depending on the operating conditions of the arrangement.

The arrangement described herein may be based on a more reliable, less noisy and fast dynamic error amplifier (as possibly integrated in a pre-regulator such as 5973AD) in the place of hysteretic control with external comparators.

Without prejudice to the underlying principle of the invention, the details and embodiments may vary, even significantly, with respect to what has been described and shown by way of example only, without departing from the scope of the invention as defined by the annexed claims.

The invention claimed is:

1. A driver arrangement for light emitting diodes, the driver arrangement comprising:
   a high frequency PWM controller to deliver a light emitting diode feed voltage between a first output line and a ground output line, said controller having a PWM controller feedback pin,
   a linear current regulator coupled to said ground output line of said controller to regulate the light emitting diode feed current, said current regulator selectively couplable to a reference voltage,
   a connection switch selectively actuatable to connect said feedback pin of said controller to a scaled-down version of the voltage on the first output line of said controller, and
   a PWM control line to receive an on/off PWM control signal to selectively produce controlled light emitting diode dimming, said PWM control line coupled to said current regulator and said connection switch to selectively couple said current regulator to said reference voltage and control switching of said connection switch, whereby:
   in one of the on/off levels of said PWM control signal, said current regulator is configured to interrupt said light emitting diode feed current, the voltage on said ground output line of said controller is floating, and said connection switch connects said PWM controller feedback pin to said scaled-down version of the voltage on said first output line of said controller, and
   in the other of the on/off levels of said PWM control signal, said current regulator is coupled to said reference voltage and controls said light emitting diode feed current, said connection switch disconnects said feedback pin of said controller from said scaled-down version of the voltage on the first output line of said controller and the voltage on said ground output line of said controller is regulated.

2. The arrangement of claim 1, further comprising:
   a control switch connected to said PWM control line to cause said current regulator to be coupled to either of a non-zero reference voltage and a zero reference value.

3. The arrangement of claim 1,
   wherein said controller is configured to regulate the voltage of said first output line at a level higher than the threshold or the sum of the thresholds of the light emitting diode or light emitting diodes driven by the arrangement while said PWM controller feedback pin is connected by said connection switch to said scaled-down version of the voltage on said first output line of said controller, thus allowing said current regulator to operate at a subsequent PWM turn on.

4. The arrangement of claim 1,
   wherein said controller is configured to regulate the voltage on said ground output line at a given value while said current regulator is activated.

5. The arrangement of claim 4,
   wherein said given value is a minimum value to minimize power losses in said current regulator while permitting light emitting diode current to be regulated by said current regulator when activated.

* * * * *